United States Patent [19]

Dietrich

[11] 4,198,560
[45] Apr. 15, 1980

[54] WALKING BEAM SHRINK TUNNEL APPARATUS

[75] Inventor: Darrel R. Dietrich, Topeka, Kans.

[73] Assignee: Cavalier Products, Inc., St. Louis, Mo.

[21] Appl. No.: 814,309

[22] Filed: Jul. 11, 1977

[51] Int. Cl.² .............................................. F27D 3/12
[52] U.S. Cl. .................................. 219/388; 219/348; 219/349; 198/774; 432/11; 432/239
[58] Field of Search ............... 219/342, 347, 348, 349, 219/352, 354, 388, 404, 405, 411; 198/774; 53/25, 305, 33, 184 S; 34/4, 39, 236; 432/11, 121, 134, 143, 147, 239

[56] References Cited

U.S. PATENT DOCUMENTS

| | | | |
|---|---|---|---|
| 1,675,948 | 6/1928 | McKee | 198/774 |
| 1,675,949 | 7/1928 | McKee | 34/236 |
| 1,942,538 | 1/1934 | Cutler | 198/774 |
| 2,057,367 | 10/1936 | Cone | 432/239 |
| 2,497,768 | 2/1950 | Hallead | 198/774 |
| 3,600,553 | 8/1971 | Costello | 219/349 |
| 3,711,957 | 1/1973 | Carver, Jr. | 219/388 C |
| 3,721,804 | 3/1973 | Feldman | 53/184 S |
| 3,818,182 | 6/1974 | Linde | 219/405 |
| 3,894,343 | 7/1975 | Pray et al. | 219/348 |
| 3,915,441 | 10/1975 | Matsukawa et al. | 432/11 |
| 4,015,340 | 4/1977 | Treleven | 219/348 |

FOREIGN PATENT DOCUMENTS

| | | | |
|---|---|---|---|
| 251123 | 4/1966 | Fed. Rep. of Germany | 219/348 |
| 545148 | 11/1956 | Italy | 219/352 |

Primary Examiner—Bruce A. Reynolds
Assistant Examiner—Bernard Roskoski
Attorney, Agent, or Firm—Paul M. Denk

[57] ABSTRACT

A walking beam shrink tunnel apparatus for sealing plastic film wrapped on an article, as the article is transported through a heat tunnel surrounding a portion of a walking beam type conveyor, a pair of heating elements located upwardly of the heat tunnel, and being adjustably set through temperature control means for regulating the radiant heat emanating from the elements, heat seals the film wrapped article; the walking beam type conveyor comprising alternately arranged stationary and walking beams, the latter being movably supported upon a base that operates to shift the walking beams in a substantially elliptical pattern for affecting movement of the film wrapped articles along the conveyor and through the arranged heat tunnel.

26 Claims, 11 Drawing Figures

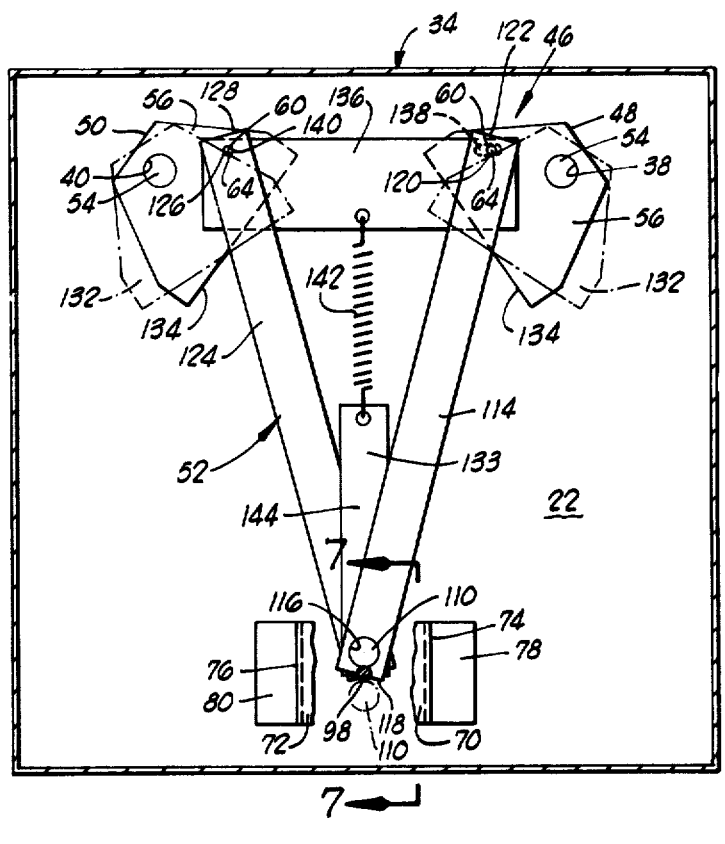
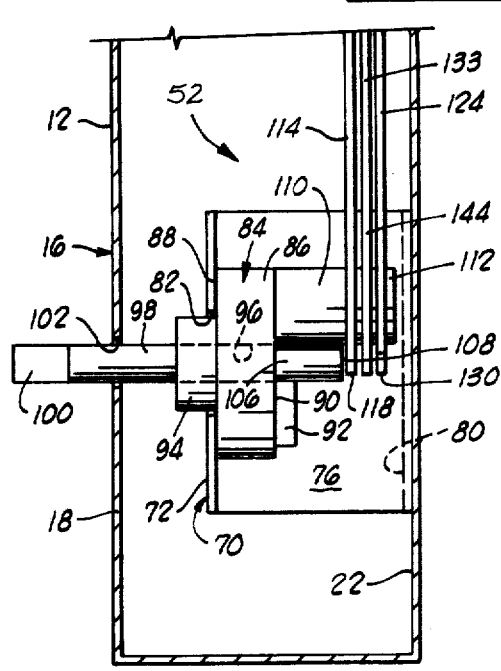
FIG. 6
FIG. 7

WALKING BEAM SHRINK TUNNEL APPARATUS

SUMMARY OF THE INVENTION

The packaging of retail articles in heat sealed plastic film has become a common practice throughout the United States. For example, many supermarkets have bakery sections in which baked items such as rolls, cookies and the like, wrapped in plastic film, are sold on a self-service basis. By wrapping such articles in plastic film, the articles can be made accessible to the public for a selection of the desired article without giving rise to sanitation problems that public access could otherwise entail.

The present invention provides an apparatus for packaging articles in plastic films using a minimum of heat energy. In particular, the present invention contemplates the use of a walking beam conveyor to pass film wrapped articles through a heating chamber so that heat is not wasted by continually re-heating large portions of the conveyor. The conveyor includes a plurality of stationary beams and a plurality of walking beams which are interspersed between the stationary beams. The walking beams are cyclically moved along a substantially elliptical path to pick up and advance the articles a pre-selected distance for each cycle thereof. Such elliptical motion is imparted to the walking beams by mounting the walking beams on rods which undergo a reciprocating motion relative to blocks which, in turn, undergo a reciprocating motion with respect to the stationary beams.

Articles are heated by radiant heaters which are angularly positionable within the heating chamber to permit the temperature to which the articles are subjected to be controlled by positioning the heaters.

An object of the invention is to provide a heat shrink packaging apparatus which uses a minimum of heat energy to package articles in plastic film.

Another object of the invention is to provide a heat shrink packaging apparatus with a simple, inexpensive temperature control capability.

Other objects and advantages of the invention will be evident from the following detailed description when read in conjunction with the accompanying drawings.

BRIEF DESCRIPTION OF THE DRAWINGS

FIG. 6 is a side elevational view of the temperature control assembly of the walking beam shrink tunnel apparatus.

FIG. 7 is an end view of the eccentric bracket and the eccentric cylinder of the temperature control assembly taken along line 7—7 of FIG. 6.

DESCRIPTION OF THE PREFERRED EMBODIMENT

Figure 1:
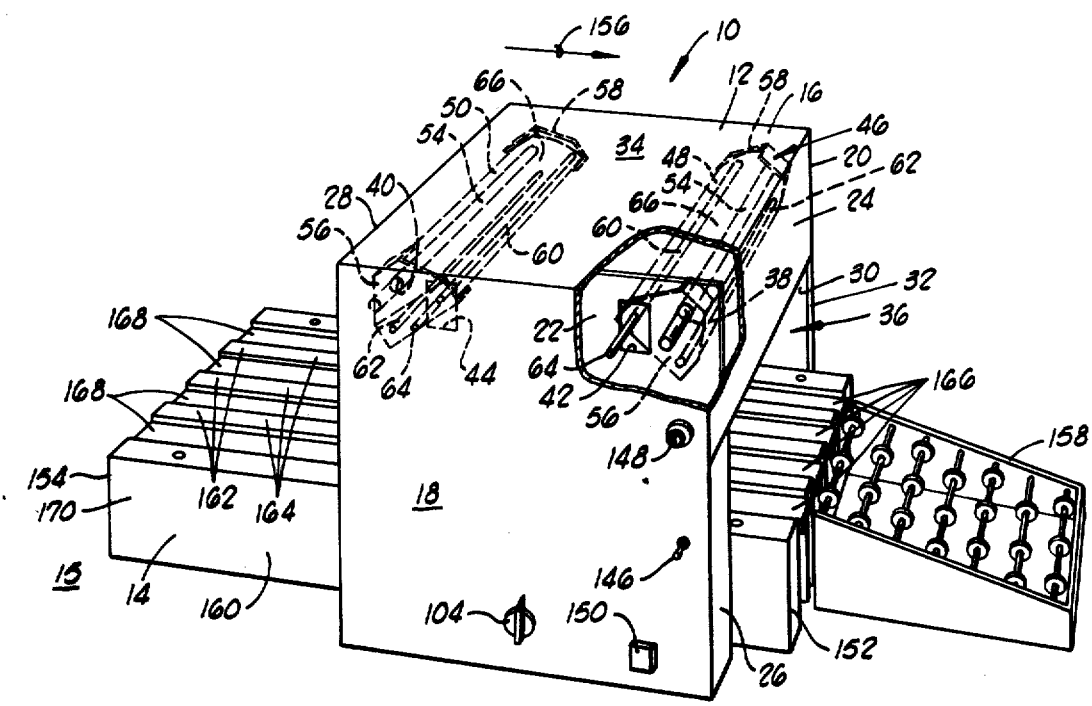
FIG. 1 is a perspective view of a walking beam shrink tunnel apparatus constructed in accordance with the present invention.

Referring now to the diagrams and to FIG. 1 in particular, shown therein and designated by the general reference numeral 10 is a walking beam shrink tunnel apparatus constructed in accordance with the present invention. The walking beam shrink tunnel apparatus 10 generally comprises a heating chamber 12 and a conveyor assembly 14 which, in operation, are individually supported on a supporting surface 15 such as, for example, a table top.

The heating chamber 12 comprises a casing 16 having a first side 18 and a second side 20 which is generally parallel to the first side 18 and spaced a distance therefrom. A first interior bulkhead 22 is formed in the casing 16 near the first side 18. The first interior bulkhead 22 is generally parallel to the first side 18 and spaced a distance therefrom generally toward the second side 20 of the casing 16. The interior bulkhead 22 is connected to the first side 18 at the forward end 24 of the casing 16 by a flange 26 formed on the first side 18 and extending generally toward the second side 20. The interior bulkhead 22 can be conveniently attached to the flange 26 by, for example, sheet metal screws or welding. A similar flange 27 (shown in FIG. 2) connects the first interior bulkhead 22 to the first side 18 at the rear end 28 of the casing 16.

A second interior bulkhead 30 is formed in the casing 16 near the second side 20 thereof. The second interior bulkhead 30 is generally parallel to the second side 20 and is displaced a short distance therefrom generally toward the first side 18. The second interior bulkhead 30 is attached to the second side 20 by means of a flange 32 at the forward end 24 of the casing 16 and by a similar flange 33 at the rear end 28 of the casing 16.

The second side of the casing 16 is connected to the first side 18 thereof by sheet metal top member 34 which is attached to the sides 18, 20 and the interior bulkheads 22, 30 in any convenient manner. The top member 34 has the general form of an inverted U and the lengths of the legs of the top member 34 is less than the heights of the sides 18, 20 and the interior bulkheads 22, 30 so that a tunnel 36 is formed in the lower portion of the casing 16 and extends longitudinally therethrough to intersect the forward end 24 and the rear end 28 of the casing 16.

A first circular aperture 38 is formed in the first interior bulkhead 22 near the forward end 24 of the casing 16 and near the top member 34 thereof. A second circular aperture 40 is formed in the first interior bulkhead 22 near the rear end 28 and near the top member 34 thereof. A second circular aperture 40 is formed in the first interior bulkhead 22 near the rear end 28 and near the top member 34. The apertures 38, 40 are symetrically positioned with respect to the ends 24, 28 of the casing 16 and are vertically positioned such that a line connecting the centers of the apertures 38, 40 will be substantially horizontal. (As used herein, the term horizontal refers to the orientation of the portion of the top member 34 forming the base of the U-shaped form thereof as illustrated in FIG. 1). Similarly, two circular apertures (not shown) are formed in the second interior bulkhead 30. The two apertures (not shown) in the second interior bulkhead 30 are positioned with respect to the ends 24, 28 of the casing 16 and the top member 34 thereof in a manner which is identical to the positioning of the apertures 38, 40 with respect to the ends 24, 28 and the top member 34.

A first rectangular aperture 42 is formed in the first interior bulkhead 22 near the first circular aperture 38. The first rectangular aperture 42 is displaced a short distance from the first circular aperture 38 generally toward the rear end 28 of the casing 16 and away from the top member 34 thereof. A second rectangular aperture 44 is formed in the first interior bulkhead 22 near the second circular aperture 40. The second rectangular aperture 44 is displaced a short distance from the second circular aperture 38 generally toward the forward end 24 of the casing and away from the top member 34 thereof. The purpose of the apertures 38, 40, 42 and 44 in the first interior bulkhead 22 and the apertures (not shown) in the second interior bulkhead 30 will be discussed more fully hereinbelow.

The heating chamber 12 includes a heating assembly, generally designated 46 and comprising a first radiant heater 48, a second radiant heater 50 and a temperature control assembly, generally designated 52. (For clarity of illustration, the temperature control assembly 52 has not been shown in FIG. 1, but it may mount upon the surface of bulk head 22. Rather, FIGS. 6 and 7 have been included to illustrate the temperature control assembly 52 which will be discussed with reference thereto below).

The first radiant heater 48 comprises a heating element 54 mounted proximate the top member 34 of the casing 16. The heating element 54 is a commercially available rod-shaped electrical heating element, and the construction of such heating elements is well known in the art so that the construction of the heating element 54 need not be discussed herein. It suffices to note that the heating element 54 is a resistive hearing element which may be energized by electrical energy delivered thereto via electrical conduits (not shown) connected to terminals (not shown) at the ends thereof. The heating element 54 is selected such that the length thereof exceeds the separation of the first interior bulkhead 22 and the second interior bulkhead 30. The heating element 54 is rotatably mounted in the casing 16 by inserting one end thereof through the first circular aperture 38 in the first interior bulkhead 22, and by inserting the other end thereof through the circular aperture (not shown) in the second interior bulkhead 30 which is aligned with the first circular aperture 38. Thus, the heating element 54 extends horizontally between the bulkheads 22, 30 in a direction transverse to the tunnel 36.

The first radiant heater 48 further comprises a first reflector bracket 56 mounted on the heating element 54 near the first interior bulkhead 22 and between the bulkheads 22, 30. A second reflector bracket 58 is similarly mounted on the heating element 54 near the second interior bulkhead 30 and between the bulkheads 22, 30. A first bracket connecting rod 60 and a second bracket connecting rod 62 are attached to the brackets 56, 58 and extend therebetween to maintain a substantially parallel, spaced apart relation between the brackets 56, 58. The first bracket connecting rod 60 is longer than the separation of the brackets 56, 58, and one end 64 thereof extends through the first rectangular aperture 42 in the first interior bulkhead 22 for a purpose which will be discussed below.

The first radiant heater further comprises a reflector 66 formed of sheet metal bent in the form of a semi-cylinder; that is, in the form of a portion of a cylindrical surface. In particular, the reflector 66 is an elliptical semi-cylinder; that is, the reflector 66 is shaped in the form of a portion of the surface of a cylinder having an elliptical cross section. As is well known in the art, any ellipse has two foci separated by an inter-focal distance characteristic of the geometry of that particular ellipse so that the reflector 66 has two focal lines separated by a pre-selected interfocal distance. In the radiant heater 48, the reflector 66 is positioned with respect to the heating element 54 such that a first focal line of the reflector 66, nearest the reflector 66, substantially coincides with the axis of the heating element 54. The selection criterion of the interfocal distance of the reflector 66 and the positioning of the second focal line of the reflector 66 will be discussed more fully hereinbelow.

The second radiant heater 50 differs from the first radiant heater 48 in only one respect so that it will not be necessary for purposes of this disclosure to describe the construction of the second radiant heater 50 in detail. Rather, it wil suffice to note the difference between the radiant heaters 48, 50 and to designate identical elements of the radiant heaters 48, 50 with identical numerical designations. The second radiant heater 50 differs from the first radiant heater 48 only in the positioning of the bracket connecting rods 58, 60. The first bracket connecting rod 60 of the first radiant heater 48 is positioned to the left, as viewed in FIG. 1, of the second bracket connecting rod 62 so that one end 64 of the first bracket connecting rod 58 of the first radiant heater 48 extends through the first rectangular aperture 42. In the second radiant heater 50, the first bracket connecting rod 60 is positioned to the right, as viewed in FIG. 1, of the second bracket connecting rod 62, and one end 64 of the first bracket connecting rod 60 of the second radiant heater 50 extends through the second rectangular aperture 44.

FIGS. 6 and 7 have been included to more clearly illustrate the construction of the temperature control assembly 52. The temperature control assembly 52 is mounted on the casing 16 between the first side 18 and the interior bulkhead 22 thereof. For this purpose, the temperature control assembly 58 includes an eccentric bracket 70 attached to the first interior bulkhead 22 by any suitable means, for example, by spot welding.

The eccentric bracket 70 is generally U-shaped and the base portion 72 of the U is disposed substantially parallel to the first side 18 of the casing 16 and the first interior bulkhead 22 thereof. The legs 74 and 76 extend from the base portion 72 to the first interior bulkhead 22 and are provided with flanges 78 and 80 which may be welded or otherwise attached to the first interior bulkhead 22 to mount the eccentric bracket 70 thereon. A circular aperture 82 is formed in the base portion 72 of the eccentric bracket 70.

The temperature control assembly 52 includes a bearing 84 having a cylindrical body portion 86. The body portion 86 has a first face 88 attached to the base portion 72 of the eccentric bracket 70, and a second face 90 which is positioned between the base portion 72 and the first interior bulkhead 22. The second face 90 is substantially parallel to the first interior bulkhead 22. A shoulder 92 is formed on the second face 90, the shoulder 92 extending generally vertically along the second face 90 and offset a pre-selected distance from the axis of the body portion 86 for a purpose that will be discussed below. A cylindrical hub portion 94 is formed on the first face 88 of the body portion 86, and the hub portion 94 extends through the aperture 82 in the base portion 72 of the eccentric bracket 70 for alignment of the bearing 84 thereon. A bore 96 is formed through the bearing 84 concentric with the axis of the body portion 86 thereof.

The temperature control assembly 52 further includes a shaft 98 that is rotatably mounted in the bore 96, the shaft 98 having a portion 100 that extends from and is disposed to pass through an aperture 102 in the first side 18 of the casing 16. A control knob 104 (illustrated in FIG. 1) is mounted on the portion 100 of the shaft 98 to permit manual positioning of the shaft 98 in the bore 96. Another portion 106 of the shaft 98 extends from the second face 90 of the body portion 86 of the bearing 84 and terminates at an end 108 disposed a pre-selected distance therefrom. An eccentric cylinder 110 is welded to the portion 106 of the shaft 98 such that the axis of the eccentric cylinder 110 is substantially parallel to the axis of the shaft 98 and is displaced therefrom by a distance equal to the combined radii of the shaft 98 and the eccentric cylinder 110. The eccentric cylinder 110 slidingly engages the second face 90 of the body portion 86 of the bearing 84, and the eccentric cylinder 110 can be moved along a circular arc about the axis of the shaft 98 by turning the shaft 98. The extent of the arc through which the eccentric cylinder 110 can be turned is limited by the shoulder 92 formed on the second face 90 of the body portion 86 of the bearing 84. The pre-selected distance by which the shoulder 92 is offset from the axis of the body portion 86 is substantially equal to one-half the diameter of the eccentric cylinder 110 so that the eccentric cylinder 110 will engage the shoulder 92 at each end of an arc substantially equal to one-half turn. Since the shoulder 92 is vertically oriented, the eccentric cylinder 110 can be turned from an upper position, illustrated by a solid cycle in FIG. 6, wherein the axis of the eccentric cylinder 110 is disposed vertically upwardly from the axis of the shaft 98, to a lower position, illustrated by a dashed circle in FIG. 6, wherein the axis of the eccentric cylinder 110 is disposed vertically downwardly from the axis of the shaft 98.

A portion 112 of the eccentric cylinder 110 extends beyond the end 108 of the shaft 98 toward the first interior bulkhead 22, and a first reflector link 114 connects the portion 112 of the eccentric 110 to the end 64 of the first bracket connecting rod 60 of the first radiant heater 48, the end 64 extending through the first rectangular aperture 42 as has been previously described to permit such connection. (For clarity of illustration, the rectangular apertures 42, 44 have not been shown in FIG. 6).

The first reflector link 114 is provided with a lower circular aperture 116 near a lower end 118 thereof to permit connection of the first reflector link 114 to the eccentric cylinder 110 by positioning the aperture 116 about the portion 112 thereof. Similarly, an upper circular aperture 120 is formed in the first reflector link 114 near the upper end 122 thereof to permit connection of the first reflector link 114 to the first bracket connecting rod 60 of the first radiant heater 48 by positioning the aperture 120 about the end 64 thereof. A second reflector link 124, having an aperture 126 near the upper end 128 thereof and an aperture (not shown) near the lower end 130 thereof, similarly connects the eccentric cylinder 110 to the first bracket connecting rod 60 of the second radiant heater 50.

The reflector links 114 and 124 and the eccentric cylinder 110 provide a means for rotating the radiant heaters 48, 50 about the heating elements 54 thereof. The rotation of the shaft 98 moves the eccentric cylinder 110 along a circular arc as has been discussed above so that the lower ends 118 and 130 of the reflector links 114 and 124, respectively, are vertically displaced by a rotation of the shaft 98. Such vertical displacements of the lower ends 118, 130 of the reflector links 114, 124 turn the radiant heaters 48 and 50 about the heating elements 54 thereof via the connections of the reflector links 114 and 124 to the first bracket connecting rods 60 of the radiant heaters 48 and 50. In particular, each radiant heater 48, 50 can be turned between a first position 132, corresponding to an orientation of the shaft 98 such that the eccentric cylinder 110 is in the lower position thereof, and a second position 134, corresponding to an orientation of the shaft 98 such that the eccentric cylinder 110 is in the upper position thereof.

The temperature control assembly 52 further comprises a biasing assembly 133 for maintaining the temperature control assembly 52 in a configuration in which the temperature control assembly 52 is set via the shaft 98. The biasing assembly 133 comprises a spring plate 136 that is pivotally connected to the first bracket connecting rods 60 of the first and second radiant heater 48, 50 via apertures 138 and 140 that are formed in the spring plate 136 and placed over the ends 64 of the first bracket connecting rods 60. (The aperture 138 is a slot so that the spring plate 138 will not prevent variations in the separation of the first bracket connecting rods 60 of the radiant heaters 48 and 50 occasioned by the rotation of the radiant heaters 48 and 50). A spring 142 and spring extension 144 connect the spring plate 136 to the eccentric cylinder 110. The spring extension 144 has a circular aperture (not shown) which fits over the portion 112 of the eccentric cylinder 110 to connect the spring extension 144 thereto.

As will be clear to those skilled in the art, tension in the spring 142 will tend to move the spring plate 136 downwardly to exert a torque on the radiant heaters 48, 50, tending to rotate the radiant heaters 48, 50 toward the first positions 132 thereof. The tension in the spring 142 will also tend to draw the eccentric cylinder 110 to the upper position thereof via the spring extension 144, so that the tension of the spring 142, exerted on the radiant heaters 48, 50 via the reflector links 114, 124 and the eccentric cylinder 110, simultaneously exerts a torque on the radiant heaters 48, 50, the effect of which is to bias the rotation of the radiant heaters 48, 50 toward the second positions 134 thereof. The effect of the counteracting torques on the radiant heaters 48, 50 (exerted by the spring 142) is to place the temperature control assembly 52 under tension such that the orientations of the radiant heaters 48, 50 will remain in any position in which the radiant heaters 48, 50 are placed by rotation of the shaft 98.

Returning now to FIG. 1, shown therein are: a switch 146 by means of which the heaters 54 are connected to a source of electrical power via an electrical supply cord (not shown); a pilot light 148 connected to the switch 146 to indicate when power is being supplied to the heaters 54; and an electrical receptacle 150, connected to the switch 146. The electrical receptacle 150 provides a convenient source of electrical power for appliances which may be used in conjunction with the walking beam shrink tunnel apparatus 10.

The conveyor assembly 14 is positioned with respect to the heating chamber 12 such that the conveyor assembly 14 extends through the tunnel 36 in the casing 16. The conveyor assembly 14 has a forward end 152 positioned forwardly of the forward end 24 of the casing 16, and a rear end 154 positioned rearwardly of the rear end 28 of the casing 17. As will be more fully discussed below, the conveyor assembly 14 transports articles placed near the rear end 154 thereof through the tunnel 36 in a forward direction 156. A roller assembly 158 can be placed in an abutting position with the forward end 152 of the conveyor assembly 14 to transfer articles so transported through the tunnel 36 to the supporting surface 15.

The conveyor assembly 14 comprises a base 160 having three stationary beams 162 fixedly mounted thereon and extending longitudinally therealong. It will be recognized by those skilled in the art that a greater or lesser number of stationary beams 162 could be mounted on the base 160 without departing from the spirit of the present invention. The stationary beams 162 are transversely spaced and, as will be described more fully below, are mounted on the base 160 such that the upper surfaces 164 of the stationary beams 162 cooperate to form a fixed horizontal support surface.

The fixed mounting of the stationary beams 162 on the base 160, to be described below, positions the fixed horizontal support surface at a preselected height with respect to the supporting surface 15. Similarly, the positioning of the heating elements 54 in the casing 16 positions the reflectors 66 with respect to the supporting surface 15. The interfocal distance referred to hereinabove in conjunction with the description of the radiant heaters 48, 50 is selected such that the second focal line of each radiant heater 48, 50 will substantially coincide with the fixed horizontal support surface when the radiant heater 48, 50 is in the first position 132. Thus, in the first position 132 of the radiant heaters 48, 50, radiant heat energy is focused on the stationary beams 162 to cause maximum heating thereof. As will be clear from the description of the temperature control assembly 52 above, the second focal line is above the stationary beams 162 in other positions at the radiant heaters 48, 50. The transfer of heat energy from the radiant heaters 48, 50 to the stationary beams 162 is enhanced by providing the stationary beams 162 with a heat absorbing surface. In particular, the stationary beams 162 are coated with black polytetrafluroethylene to enhance heat transfer thereto.

The conveyor assembly 14 further comprises four walking beams 166 movingly supported on the base 160 and extending longitudinally therealong. It will be clear to those skilled in the art that a greater or lesser number of walking beams 166 could be used with the conveyor assembly 14 without departing from the spirit of the present invention. The walking beams 166 are movingly mounted on the base 160 such that the walking beams 166 are transversely interspersed with the stationary beams 162; that is, any two of the walking beams 166 are transversely separated by a stationary beam 162, and any two of the stationary beams 162 are transversely separated by a walking beam 166. As will be discussed more fully below, the walking beams 166 are mounted on the base 160 such that the upper surfaces 168 of the walking beams 166 cooperate to form a moving horizontal support surface. The walking beams 166 are coated with black polytetrafluroethylene to enhance heat absorption in the same manner that the stationary beams 162 are so coated.

The base 160, shown more clearly in FIGS. 2, 3, 4 and 5, comprises an exterior base portion 170 upon which the stationary beams 162 are mounted, and an exterior base portion 172 upon which the walking beams 166 are movably mounted. The exterior base portion 172 includes a first exterior beam 174 disposed on a first side 176 of the conveyor assembly 14, and a second exterior beam 178 disposed on a second side 180 of the conveyor assembly 14. The first exterior beam 174 is constructed of angle material and has a vertical web 182 which is supported by the supporting surface 15. The first exterior beam 174 also has a horizontal web 184 extending horizontally from the top 186 of the vertical web 182 toward the second exterior beam 178. Apertures 188 are formed in the horizontal web 184 near the forward end 152 of the conveyor assembly 14 and the rear end 154 thereof for a purpose to be discussed below. The second exterior beam 178 is identical in construction to the first exterior beam 174 so that a detailed discussion of the second exterior beam 178 is not necessary for purposes of this disclosure. Rather, the identity of the beams 174, 178 is noted and elements of the second exterior beam 178 that are identical to elements of the first exterior beam 174 have been provided with the same numerical designations. The second exterior beam 178 is disposed with respect to the first exterior beam 174 such that the horizontal web 182 of the second exterior beam 178 extends toward the first exterior beam 174.

A forward cross member 190, constructed of channel material, is connected to the first exterior beam 174 and to the second exterior beam 178 near the forward end 152 of the conveyor assembly 14, and extends between the first exterior beam 174 and the second exterior beam 178. A rear cross member 192, similarly constructed of channel material, is connected to the first exterior beam 174 and the second exterior beam 178 near the rear end 154 of the conveyor assembly 14, and extends between the first exterior beam 174 and the second exterior beam 178 so that the forward cross member 190 and the rear cross member 192 form the exterior base portion 170 into a rigid, substantially rectangular structure.

Three stationary beam support members 194, constructed of channel material, are connected to the forward cross member 190 and extend vertically therealong to provide support for the stationary beams 162 at the forward end 152 of the conveyor assembly 14. Similarly, stationary beam support members 196, constructed of channel material, are connected to the rear cross member 192 and extend vertically therealong to provide support for the stationary beams 162 at the rear end 154 of the conveyor assembly 14. The stationary beam support members 194, 196 can be conveniently connected to the cross members 190, 192 such as by welding, and in like manner, the stationary beams 162 can be conveniently connected to the support members 194, 196.

Figure 3:
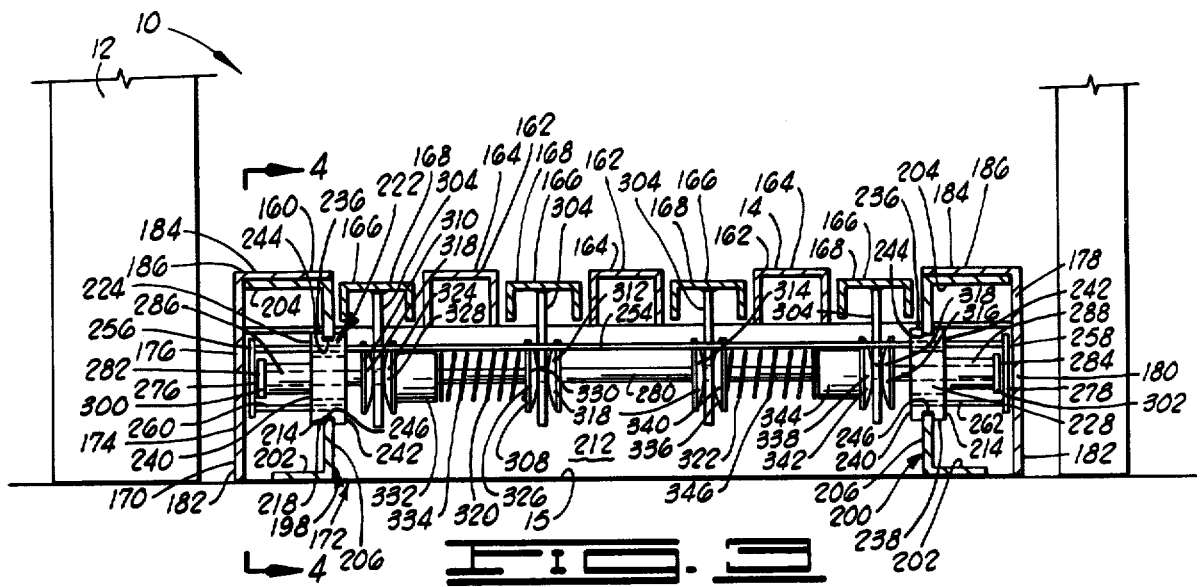
FIG. 3 is a cross section of the conveyor assembly taken along line 3—3 of FIG. 2.

The interior base portion 172 has a first interior beam 198 disposed generally on the first side 176 of the conveyor assembly 14, the first interior beam 172 extending longitudinally in a parallel relationship with the exterior beams 174, 178. A second interior beam 200 is disposed generally on the second side 180 of the conveyor assembly 14 and extends longitudinally in a parallel relationship with the exterior beams 174, 178 and the first interior beam 198. The interior beams 198, 200 are constructed of channel material such that each interior beam 198, 200 has: a horizontal lower web 202, supported by the supporting surface 15; a horizontal upper web 204, parallel to the lower web 202; and a center web 206 connecting the upper web 204 to the lower web 202. The interior beams are positioned in the conveyor assembly 14 such that the channel in each of the interior beams 198, 200 opens away from the other interior beam 198, 200 as shown in FIG. 3.

Figure 2:
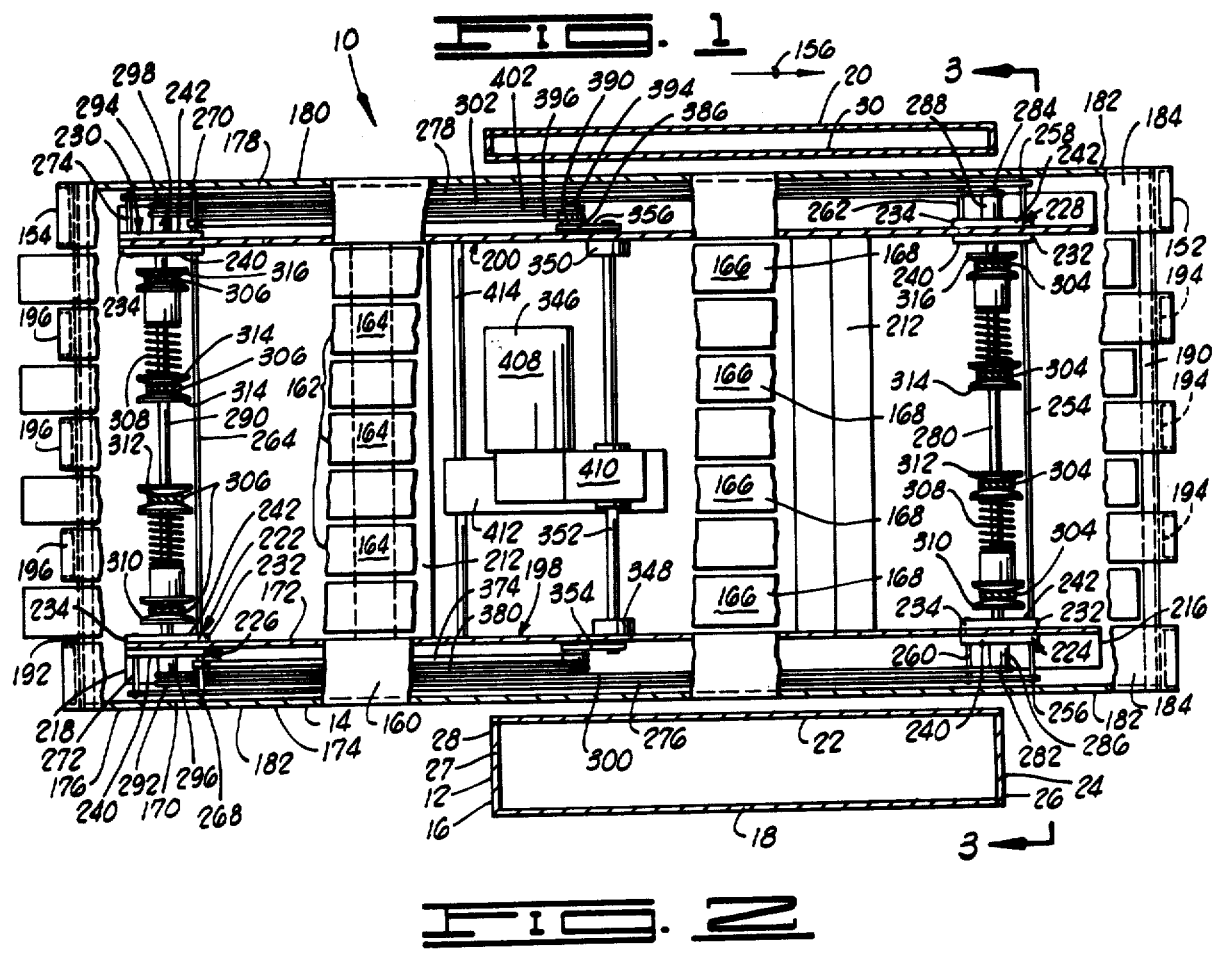
FIG. 2 is a plan view of the conveyor assembly of the walking beam shrink tunnel apparatus in partial cutaway.

Apertures 208 are formed in the upper webs 204 of the interior beams 198, 200, and the interior beams 198, 200 are positioned with respect to the exterior beams 174, 178 such that the apertures 208 are aligned with the apertures 188 in the horizontal webs 184 of the exterior beams 174, 176. Bolt fasteners 210 pass through the apertures 188, 208 to fasten the interior beams 198, 200 to the exterior beams 174, 178. Cross members 212, most clearly seen in FIG. 2, are connected, such as by welding, to the center webs 206 of the interior beams 198, 200 and extend therebetween to form the interior base portion 172 into a rigid, substantially rectangular structure.

The interior beams 198, 200 are shorter than the exterior beams 174, 178, and longitudinal slots 214 are formed in a forward end 216 and a rear end 218 of the center web 206 of each interior beam 198, 200. The slots 214 intersect the ends 216, 218 of the interior beams 198, 200 and extend longitudinally therefrom a pre-selected distance into the center web 206 of each interior beam 198, 200. A circular aperture 220 is formed in centrally disposed portions of the center webs 206 of each interior beam 198, 200 for a purpose to be discussed below. (The aperture 220 is not illustrated for the second interior beam 200).

A sliding block assembly 222 is mounted on the interior base portion 170 and supports the walking beams 166 for movement in a substantially elliptical pattern to be described below. The sliding block assembly 222 comprises: a first forward sliding block 224, slidably mounted in the slot 214 formed in the forward end 216 of the first interior beam 198; a first rear sliding block 226, slidably mounted in the slot 214 formed in the rear end 218 of the first interior beam 198; a second forward sliding block 228, slidably mounted in the slot 214 formed in the forward end 216 of the second interior beam 200; and a second rear sliding block 230, slidably mounted in the slot 214 formed in the rear end 218 of the second interior beam 200. The sliding blocks 224, 226, 228 and 230 are constructed of polytetrafluoroethylene and are identical in construction. Accordingly, it will not be necessary for purposes of this disclosure to describe each of these sliding blocks in detail. Rather, the first forward sliding block 224 will be described and it will be understood that this description will apply equally to the sliding blocks 226, 228, and 230. Identical numerical designations for features of the first forward sliding block 224 will be used to identify equivalent features of the sliding blocks 226, 228 and 230.

The first forward sliding block 224 is a rectangular parallelpiped having a forward end 232, a rear end 234, a top 236, a bottom 238, a first side 240 and a second side 242. An upper groove 244 is formed in the top 236 of the first forward sliding block 224, and a lower groove 246 is formed in the bottom 238 thereof. The first forward sliding block 224 is mounted in the slot 214 at the forward end 216 of the first interior beam 198, the grooves 244 and 246 engaging portions of the center web 206 of the first interior beam 198 that define the slot 214 so that the first forward sliding block 224 can be moved longitudinally in the slot 214. The first forward sliding block 224 is disposed on the first interior beam 198 such that its forward end 232 corresponds to the forward end 216 of the first interior beam 198. Similarly, the forward ends 232 of the first rear sliding block 226, the second forward sliding block 228 and the second rear sliding block 28 correspond to the forward ends 216 of the interior beams 198 and 200.

A support rod slot 248 is formed in the first forward sliding block 224, the support rod slot 248 intersecting the first side 240 and the second side 242 of the first forward sliding block 224, and extending therebetween such that the support rod slot 248 is transverse to the conveyor assembly 14 in the tunnel 36. The support rod slot 248 slopes downwardly in the forward direction 156; that is, the support rod slot 248 extends generally along a line extending from the intersection of the rear end 234 and the top 236 of the first forward sliding block 224 to the intersection of the forward end 232 and the bottom 238 thereof. Support rod slots 248 formed in the first rear sliding block 226, the second forward sliding block 228 and the second rear sliding block 230 similarly slope downwardly in the forward direction 156.

A circular hole 250 is formed in the first forward sliding block 224 near the intersection of the top 236 and the forward end 232 thereof, the circular hole 250 intersecting the first side 240 and the second side 242 of the first forward sliding block 224 and extending therebetween. A circular hole 252 is formed in the first forward sliding block 224 near the intersection of the bottom 238 and the rear end 234 thereof, the circular hole 252 intersecting the first side 240 and the second side 242 of the first forward sliding block 224 and extending therebetween.

A forward block connecting rod 254 passes through the hole 250 formed in the first forward sliding block 224 and extends transversely across the conveyor assembly 14 to pass through the hole 250 formed in the second forward sliding block 228. The forward block connecting rod 254 extends to either side 240, 242 of each forward sliding block 224, 228 and terminates in a first end 256, near the first side 176 of the conveyor assembly 14, and in a second end 258 near the second side 180 of the conveyor assembly 14. The forward block connecting rod 254 can conveniently be transversely positioned on the forward sliding blocks 224, 228 by means of semicircular spring clips (not shown) attached to the forward block connecting rod 254.

A first forward stud 260 is mounted in a hole 252 of the first forward sliding block 224 and extends from the first side 240 thereof a distance substantially equal to the extent of the forward block connecting rod 254 beyond the first side 240 of the first forward sliding block 224. A second forward stud 262 is mounted in the hole 252 of the second forward sliding block 228 and extends from the second side 242 thereof a distance substantially equal to the extent of the forward block connecting rod 254 beyond the second side 242 of the second forward sliding block 228. The studs 260 and 262 can be conveniently secured to the forward sliding blocks 224 and 228 respectively by means of spring clips (not shown) attached to the studs 260 and 262.

A rear block connecting rod 264 passes through the hole 250 formed in the first rear sliding block 226 and extends transversely across the conveyor assembly 14 to pass through the hole 250 formed in the second rear sliding block 230. The rear block connecting rod 264 extends to either side 240, 242 of each rear sliding block 226, 228, the rear block connecting rod 264 terminating in a first end 268 near the first side 176 of the conveyor assembly 14, and in a second end 270 near the second side 180 of the conveyor assembly 14. The rear block connecting rod 264 can conveniently be transversely positioned on the rear sliding blocks 226, 230 by means of spring clips (not shown) mounted on the rear block connecting rod 264.

A first rear stud 272 is mounted in the hole 252 of the first rear sliding block 226 and extends from the first side 240 thereof a distance substantially equal to the extent the rear block connecting rod 264 extends beyond the first side 240 of the first rear sliding block 226. A second rear stud 274 is mounted in the hole 252 of the second rear sliding block 230 and extends from the second side 242 thereof a distance substantially equal to the extent the rear block connecting rod 264 extends beyond the second side 242 of the second rear sliding block 230. The studs 272 and 274 can be conveniently secured to the rear sliding blocks 226 and 230 respectively by means of spring clips attached to the studs 272 and 274.

A first sliding block connecting arm 276 is attached to the first end 256 of the forward block connecting rod 254 and to the first forward stud 260, and extends longitudinally therefrom toward the rear end 154 of the conveyor assembly 14. The first sliding block connecting arm 276 is connected to the first end 268 of the rear block connecting rod 264 and to the first rear stud 272 so that the first forward sliding block 224 and the first rear sliding block 226 can move only in unison. Similarly, a second sliding block connecting arm 278 is connected to the second end 258 of the forward block connecting rod 254 and to the second forward stud 262 and extends rearwardly therefrom. The second sliding block connecting arm 278 is connected to the second end 270 of the rear block connecting rod 264 and to the second rear stud 274 so that the second forward sliding block 228 and the second rear sliding block 230 can move only in unison.

A forward walking beam support rod 280 passes through the support rod slot 248 formed in the first forward sliding block 224 and extends transversely across the conveyor assembly 14 to pass through the support rod slot 248 formed in the second forward sliding block 228. The forward walking beam support rod 280 extends to either side 240, 242 of each forward sliding block 224, 228, the forward walking beam support rod 280 terminating in a first end 282 near the first side 176 of the conveyor assembly 14, and in a second end 284 near the second side 180 of the conveyor assembly 14. A first forward bearing 286 is mounted on the portion of the forward walking beam support rod 282 extending from the first side 240 of the first forward sliding block 224, and a second forward bearing 288 is secured to the portion of the forward walking beam support rod 280 extending from the second side 242 of the second forward support block 228 to transversely position the forward walking beam support rod 280 with respect to the first forward sliding block 224 and the second forward sliding block 228.

Similarly, a rear walking beam support rod 290 passes through the support rod slot 248 formed in the first rear sliding block 226 and extends transversely across the conveyor assembly 14 to pass through the support rod slot 248 formed in the second rear sliding block 230. The rear walking beam support rod 290 extends to either side 240, 242 of each rear sliding block 226, 230, the rear walking beam support rod 290 terminating in a first end 292 near the first side 176 of the conveyor assembly 14, and in a second end 294 near the second side 180 of the conveyor assembly 14. A first rear bearing 296 is attached to the portion of the rear walking beam support rod 290 extending from the first side 240 of the first rear sliding block 226, and a second rear bearing 298 is attached to the portion of the rear walking beam support rod 290 extending from the second side 242 of the second rear sliding block 230 to transversely position the rear walking beam support rod 290 with respect to the rear sliding blocks 226, 230.

A first support rod connecting arm 300 is connected to the first end 282 of the forward walking beam supporting rod 280 and extends rearwardly therefrom to attach to the first end 292 of the rear walking beam support rod 290. A second support rod connecting arm 302 is attached to the second end 284 of the forward walking beam support rod 280 and extends rearwardly therefrom to attach to the second end 294 of the rear walking beam support rod 290. The first support rod connecting arm 300 and the second support rod connecting arm 302 place a constraint upon the motions of the walking beam support rods 280, 290 such that the walking beam support rods 280, 290 move in unison.

The walking beams 166 are supported on the walking beam support rods 280, 290 in a manner which will now be described. Each walking beam 166 is a length of channel material having a forward flange 304 and a rear flange 306 depending from the interior of the channel. The forward flange 304 is spaced a pre-selected distance from the rear flange 306 such that the separation of the centers of the flanges 304, 306 is substantially equal to the separation of the axes of the walking beam support rods 280, 290. Slots (not shown) are formed in the flanges 304, 306 such that the walking beams 166 can be mounted on the walking beam support rods 280, 290 by positioning the slot (not shown) in the forward flange 304 about the forward walking beam support rod 280 and positioning the slot (not shown) in the rear flange 306 about the rear walking beam support rod 290.

Each walking beam support rod 280, 290 is provided with a clamp assembly 308 to retain the walking beam 166 thereon. The clamp assembly 308 on the rear walking beam support rod 290 is identical to the clamp assembly 308 on the forward walking beam support rod 280 so that only the clamp assembly 308 on the forward walking beam support rod 280 will be described, and this description will apply equally to the clamp assembly 308. In the drawings, elements of the clamp assembly 308 on the rear walking beam support rod 290 have been identified with the same numerical designations as the corresponding elements of the clamp assembly 308 on the forward walking beam support rod 280.

The clamp assembly 308 comprises a first fixed clamp member 310, a second fixed clamp member 312, a third fixed clamp member 314 and a fourth fixed clamp member 316 disposed at pre-selected positions along the forward walking beam support rod 280. Each fixed clamp member 310, 312, 314 and 316 is a circular plate which is dished such that each fixed clamp member 310, 312, 314 and 316 has a convex face 318. The faces 318 of the first fixed clamp member 312 and the third fixed clamp member 316 are convex toward the second side 180 of the conveyor assembly 14, and the faces 318 of the second fixed clamp member 312 and the fourth fixed clamp member 316 are convex toward the first side 176 of the conveyor assembly 14. The first fixed clamp member 310 is transversely positioned on the forward walking beam support rod 280 such that a walking beam 166 having a forward flange 304 engaging the convex face 318 of the first fixed clamp member 310 will be positioned between the first interior beam 198 of the base 160 and a stationary beam 162. Similarly, the fourth fixed clamp member 316 is transversely positioned on the forward walking beam support rod 280 such that a walking beam 166 having a forward flange 304 engaging the convex face 318 of the fourth fixed clamp member 316 will be positioned between the second interior beam 200 of the base 160 and a stationary beam 162. The second fixed clamp member 312 and the third fixed clamp member 314 are positioned on the forward walking beam support rod 280 such that a walking beam 166 having a forward flange 304 engaging the convex face 318 of the second fixed clamp member 312 or the third fixed clamp member 334 will be positioned between two stationary beams 162.

A spring loaded first clamping subassembly 320 is positioned on the forward walking beam support rod 208 between the first fixed clamping member 310 and the second fixed clamping member 312 to force forward the flanges 304 of the walking beams 166 into engagement with the convex faces 318 of the fixed clamping members 310 and 312. Similarly, a spring loaded second clamping subassembly 322 is positioned on the forward walking beam support rod 280 between the third fixed clamping member 314 and the fourth fixed clamping member 316 to force the forward flanges 304 of the walking beams 166 into engagement with the convex faces 318 of the fixed clamping members 314 and 316. The first clamping subassembly 320 comprises a first clamping member 324 and a second clamping member 326 which are identical to the fixed clamping members 310, 312, 314 and 316. The first clamping member 324 has a face 328 convex toward the face 318 of the first fixed clamping member 310, and the second clamping member 326 has a face 330 which is convex toward the face 318 of the second fixed clamping member 312. A collar 332 is positioned in engagement with the first clamping member 324 and a spring 334 extends between the collar 332 and the second clamping member 326 to force forward flanges 304 of walking beams 166 against the faces 318 of the first fixed clamping member 310 and the second fixed clamping member 312. The length of the collar 332 can be chosen to select the tension in the spring.

The second clamping subassembly 332 comprises a first clamping member 336 and a second clamping member 338 which are identical to the fixed clamping members 310, 312, 314 and 316. The first clamping member 336 has a face 340 which is convex toward the face 318 of the third fixed clamping member 314, and the second clamping member 338 has a face 342 which is convex toward the face 318 of the fourth fixed clamping member 316. A collar 344 is attached to the second clamping member 338, and a spring 346 extends between the collar 344 and the first clamping member 336 to force the face 340 on the first clamping member toward the face 318 on the third fixed clamping member 314, and to force the face 342 on the second clamping member 338 toward the face 318 on the fourth fixed clamping member 316.

A walking beam 166 is mounted on the walking beam support rods 280, 290 by exerting downward pressure on the walking beam 166. The forward flange 304 thereof is in contact with the face 318 of a fixed clamping member 310, 312, 314 or 316 on the forward walking beam support rod 280, and the rear flange 306 of the walking beam is in contact with the face 318 of the corresponding fixed clamping member 310, 312, 314 or 316 on the rear walking beam support rod 290.

The sliding block assembly 222 further comprises a drive assembly 346 connected to the rear sliding blocks 226, 228 and to the rear walking beam support rod 290. This arrangement imparts a reciprocating motion to the sliding blocks 224, 226, 228 and 230 with respect to the interior beams 198, 200 and while simultaneously imparting a reciprocating motion to the walking beam support rods 280, 290 within the support rod slots 248 formed in the sliding blocks 224, 226, 228 and 230. A first bearing 348 is attached to the center web 206 of the first interior beam 198 in alignment with the circular aperture 220 formed therein, and a second bearing 350 is attached to the center web 206 of the second interior beam 200 in alignment with the circular aperture 220 formed therein to permit mounting of the drive assembly 346 on the base 160.

The drive assembly 346 includes a drive shaft 352 which is rotatingly secured to the first bearing 348 and to the second bearing 350. The drive shaft 352 extends through the first interior beam 198, and a first crank 354 is secured to the drive shaft 352 between the center web 206 of the first interior beam 198 and the vertical web 182 of the first exterior beam 174. Similarly, the drive shaft 352 extends through the second interior beam 200, and a second crank 356 is secured to the drive shaft 352 between the center web 206 of the second interior beam 200 and the vertical web 182 of the second exterior beam 178.

Figure 4:
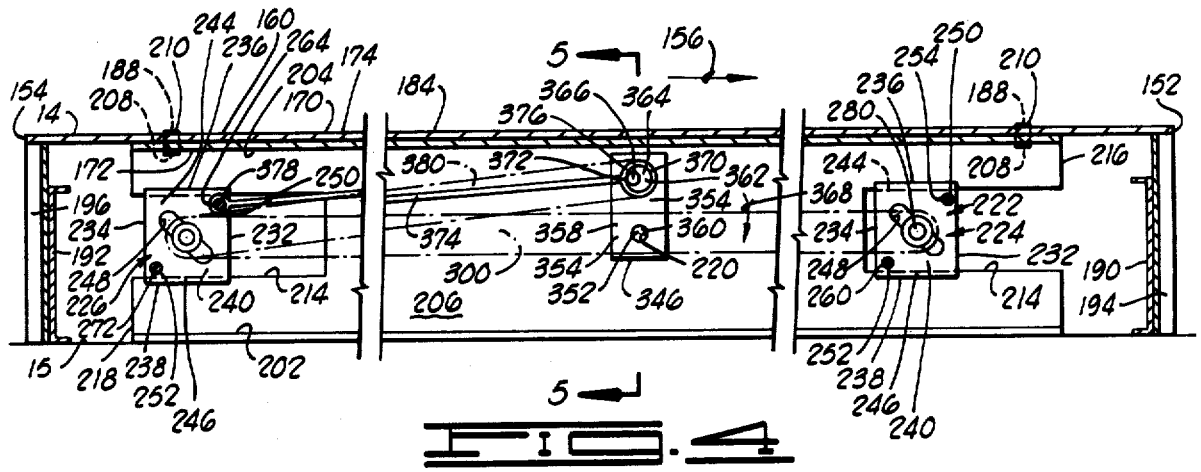
FIG. 4 is a cross section of the conveyor assembly taken along line 4—4 of FIG. 3.

The first crank 354 has a first crank arm 358 constructed of metal plate that has an aperture 360 formed therethrough perpendicularly to the laminar disposition of the first crank arm 358. The aperture 360 accepts the drive shaft 352, and the first crank arm 358 is secured to the drive shaft 352 by a set screw (not shown). A first sliding block cam 362 is secured to the crank arm 358 and extends therefrom toward the first side 176 of the conveyor assembly 14, the first sliding block cam terminating in a face 364. The first sliding block cam 362 is cylindrical in shape, and its axis is displaced a preselected distance from the axis of the drive shaft 352 and is disposed substantially parallel thereto. A first support rod cam 366 is secured to the face 364 and extends therefrom toward the first side 176 of a conveyor assembly 14. The first support rod cam 366 is cylindrical in shape and its axis is substantially parallel to the axis of the first sliding block cam 362. The first support rod cam 366 is positioned to one side of a line connecting the axes of the sliding block cam 362 and the drive shaft 352 as will now be described. During operation of the conveyor assembly 14, the first crank is turned in a clockwise direction 368 as illustrated in FIG. 4 such that the first crank arm 358 has a leading edge 370 and a trailing edge 372. The first support rod cam 366 is displaced from the axis of the first sliding block cam 362 toward the trailing edge 372 of the first crank arm 358.

A first sliding block drive rod 374 connects the first sliding block cam 362 to portions of the rear block connecting rod 264 near the first end 268 thereof. For this purpose a loop 376 is formed on one end of the first sliding block drive rod 374, the loop 376 rotatingly engaging the first sliding block cam 362. A loop 378 is formed on the other end of the first sliding block drive rod 374, the loop 378 rotatingly engaging the rear block connecting rod 264.

A first support rod drive rod 380 connects the first support rod cam 366 to portions of the rear walking beam suport rod 290 near the first end 292 thereof. For this purpose an aperture (not shown) is formed in one end of the first support rod drive rod 380, the aperture so formed rotatably engaging the first support rod cam 366. An aperture (not shown) is formed in the other end of the first support rod drive rod, and the aperture so formed rotatably engages the rear walking beam support rod 290.

The second crank 356 is constructed in an identical manner to the first crank 354, the second crank 356 comprising: a second crank arm 386, a second sliding block cam 390 and a second support cam 394. The second crank 356 is mounted on the drive shaft 352 such that the second crank arm 386 is parallel to the first crank arm 358 and the axes of the second sliding block cam 390 and the second support rod cam 394 are coaxial with the axes of the first sliding block cam 362 and the first support rod cam 366 respectively.

A second sliding block drive rod 396, constructed identically to the first sliding block drive and 374, connects the second sliding block cam 390 to the rear block connecting rod 264 in the same manner that the first sliding block drive rod 374 connects the first sliding block cam 362 to the rear block connecting rod 264. A second support rod drive rod 402, constructed identically to the first support rod drive rod 380, connects the second support rod cam 394 to the rear walking beam support rod 290 in the same manner that the first support rod drive rod 380 connects the first support rod cam 366 to the rear walking beam support rod 290.

During operation of the conveyor assembly 14, the cranks 354, 356 are rotated in the clockwise direction 368 shown in FIG. 4. For this purpose, an electric motor 408 is connected to the drive shaft 352 between the interior beams 174, 178 via a gear reducer 410. The electric motor 408 is connected to the switch 146 by electrical conduits (not shown). The motor 408 is supported by a motor mount 412 which is secured to the interior base portion 172 via a support rod 414 to which the motor mount 408 is attached. The support rod 414 extends between the first interior beam 174, and the second interior beam 178 and is attached to the interior beams 174, 178.

OPERATION OF THE WALKING BEAM SHRINK TUNNEL APPARATUS

During operation thereof, the walking beam shrink tunnel apparatus 10 is generally assembled as illustrated in FIG. 1. The heating chamber 12 is disposed on the supporting surface 15 and the conveyor assembly 14 is supported by the supporting surface 15 and extends longitudinally through the tunnel 36 in the casing 16 of the heating chamber 12. An article wrapped in plastic film, such as polyvinyl chloride, is placed on a conveyor assembly 14 near the rear end 154 and the conveyor assembly 14 is actuated to transport the article through the tunnel 36. The radiant heaters 48, 50 heat the interior of the tunnel 36 and heat the stationary beams 162 and walking beams 166 so that the plastic film on the article softens and seals to itself to package the article. The operation of the conveyor assembly 14 is initiated by actuating the switch 146 to transmit an electric current to the motor 408 which rotates the drive shaft 352 in the clockwise direction 368 illustrated in FIG. 4. As the drive shaft 352 turns, the sliding block cams 362 and 390 are moved along circular paths by the crank arms 358 and 386 to impart a reciprocating motion to the rear sliding blocks 226 and 230 via the sliding block drive rods 374 and 396 respectively. The forward sliding blocks 224 and 228 are forced to undergo an identical reciprocating motion by the sliding block connecting arms 276 and 278 which connect the first forward sliding block 224 to the first rear sliding block 226 and connect the second forward sliding block 228 to the second rear sliding block 230 respectively. Accordingly, the sliding blocks 224, 226, 228 and 230 longitudinally reciprocate in unison and the slots 214 in the interior beam members 198 and 200.

Since the support rod cam 366 and 394 are mounted on a sliding block cams 366 and 390 respectively, the support rod cam 366 and 394 are similarly moved along circular paths to reciprocate the rear walking beam support rod 290 via the connections thereto provided by the first support rod drive rod 380 and the second support rod drive rod 402. Since the forward walking beam support rod 280 is connected to the rear walking beam support rod 290 by the first support rod connecting arm 300 and the second support rod connecting arm 302, the forward walking beam support rod will move in unison with the rear walking beam support rod 290.

Accordingly, the sliding blocks 224, 226, 228 and 230 reciprocate in unison, and the walking beam support rods 280 and 290 reciprocate in unison. The reciprocation of the walking beam support rods 280 and 290 differs from the reciprocation of the sliding blocks 224, 226, 228 and 230 in two respects. Since the support rod cams 366 and 394 are offset on the sliding block cams 362 and 390 respectively, the amplitude of the reciprocation of the walking beam support rods 280 and 290 is slightly larger than the amplitude of the reciprocation of the sliding blocks 224, 226, 228 and 230 and is out of phase therewith. The result is that the walking beam support rods 280 and 290 undergo a reciprocating motion in the support rod slots 248 formed in the sliding blocks 224, 226, 228 and 230 as the support rods 280, 290 and the sliding blocks 224, 226, 228, 230 reciprocate longitudinally. Thus, since the support rod slots 248 are formed on a slope, the reciprocation of the walking beam support rods 280 and 290 with respect to the sliding blocks 224, 226, 228 and 230 produced a vertical reciprocation of the walking beam support rods 280 and 290 as the walking beam support rods 280 and 290 reciprocate longitudinally. Since the vertical reciprocation of the walking beam support rods 280 and 290 is out of phase with the reciprocation of the sliding blocks 224, 226, 228 and 230, the walking beam support rods undergo a substantially elliptical motion. Moreover, since the support rod cams 366, 394 are positioned on the sliding block cams 366, 390 respectively such that the circular motion of the support rod cams 366, 394 trails the circular motion of the sliding block cams 366, 390, and since the support rod slots 248 slope downwardly in the forward direction 156, the walking beam support rods 280 and 290 attain a maximum vertical height a short time after the walking beam support rods 280 and 290 have attained a maximum rearward extent. Thus, the walking beam support rods 280 and 290 move in the forward direction 156 while the walking beam support rods 280 and 290 are disposed on the upper portions of the elliptical paths upon which the walking beam support rods 280 and 290 move. Since the walking beam support rods 280 and 290 move in unison, and since the walking beams 166 are mounted on the walking beam support rods 280 and 290 via the flanges 304 and 306, each point on the walking beams 166 undergoes motion along a substantially elliptical path corresponding to the elliptical motion of the walking beam support rods 280 and 290. Such motion will be referred to herein as motion of the walking beams 166 in a substantially elliptical pattern.

Figure 5:
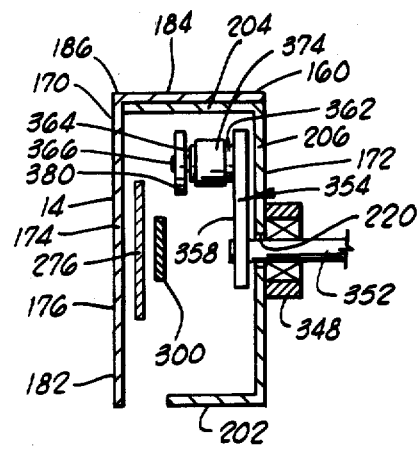
FIG. 5 is a partial cross section of the conveyor assembly taken along line 5—5 of FIG. 4.
Figure 8:
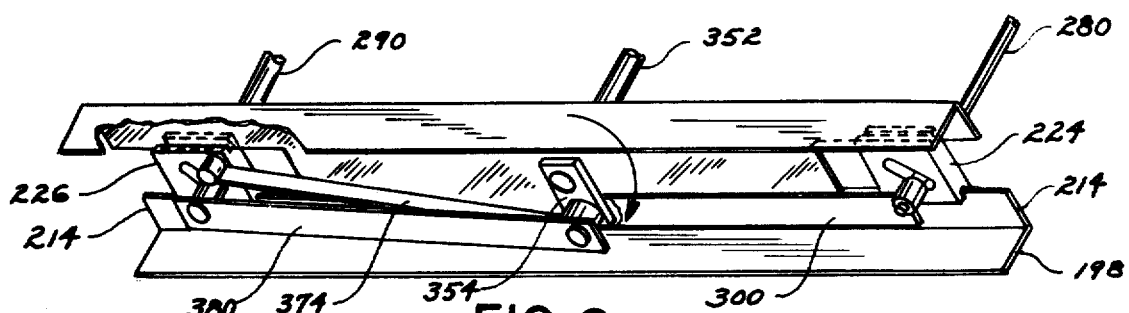
FIG. 8 gives a view of the conveyor assembly of FIG. 4 during operation.
Figure 9:
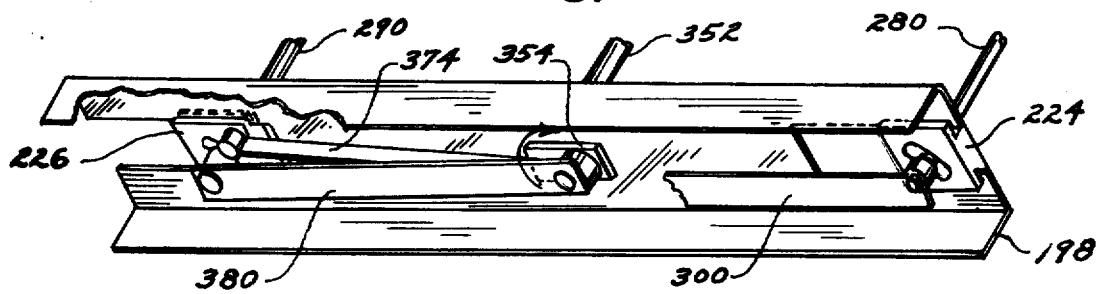
FIG. 9 is a view of the conveyor assembly of FIG. 4 during another period of operation.
Figure 10:
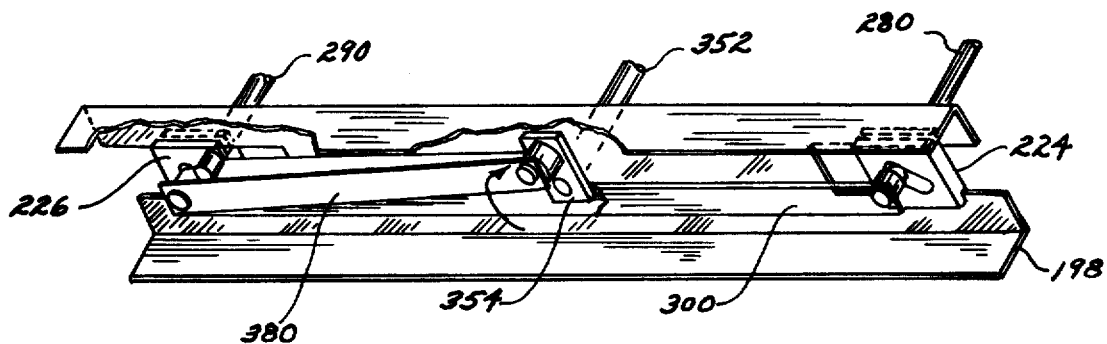
FIG. 10 is a view of the conveyor assembly of FIG. 4 during an additional period of operation.
Figure 11:
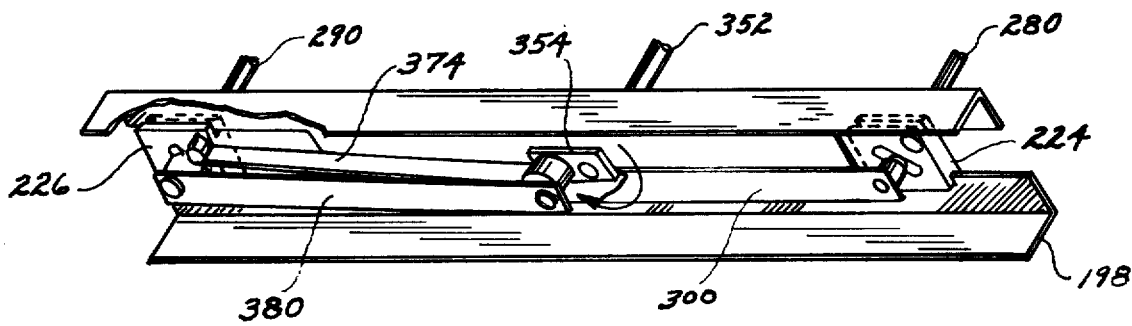
FIG. 11 is a view of the conveyor operation of FIG. 4 during a final stage of operation during a cycle of operation.

A cycle of operation for the conveyor assembly of this invention is shown in FIGS. 8 thru 11, with the operative components of these figures having the relative relationship to the identical components previously analyzed and described in FIGS. 4 and 5.

The lengths of the flanges 304, 306 are selected such that the moving horizontal support surface formed by the upper surfaces 168 of the walking beams 166 is below the fixed horizontal surface formed by the upper surfaces 164 of the stationary beams 162 while the walking beams 166 are moving along the lower portion of the substantially elliptical pattern, and such that the moving horizontal support surface is above the fixed horizontal support surface while the walking beams 166 are moving in the upper portion of the substantially elliptical pattern. Accordingly, an article placed on the conveyor assembly 14 will be lifted by the moving horizontal support surface and moved in the forward direction 156 each time the walking beams 166 undergo the upper portion of the substantially elliptical pattern. While the walking beams 166 move in the lower portion of the substantially elliptical pattern thereof, the moving horizontal support surface is below the fixed horizontal support surface so that the article rests on the fixed horizontal support surface. Accordingly, the article is moved through the tunnel 36 in the heating chamber 12 in a series of discrete steps.

The degree of heating to which the article is subjected while it is moved through the tunnel 36 in the heating chamber 12 is varied by angularly positioning the radiant heaters 48, 50 via the temperature control assembly 52. To increase the degree of heating, the shaft 98 is turned to move the eccentric cylinder 110 toward the lower position thereof. As the eccentric cylinder 110 moves toward the lower position, the reflector links 114, 124 are pulled downwardly to exert a downward force on the ends 64 of the first bracket connecting rods 60 of the radiant heaters 48, 50 to move the radiant heaters 48, 50 toward the first positions 132 thereof. Since, as has been described above, radiant heat from the heaters 48, 50 is focused on the stationary beams 162 when the radiant heaters 48, 50 are in the first position, turning the radiant heaters 48, 50 toward the first position narrows the distribution of radiant heat along the longitudinal extent of the stationary beams 162 to concentrate radiant heat on a small region of the stationary beam 162. Since the stationary beams 162 are provided with a heat absorbing coating, the temperature of the region upon which radiant heat is concentrated increases to subject the article to a higher degree of heating. A corresponding decrease in the degree of heating of the article is occasioned by turning the shaft 98 such that the eccentric cylinder 110 is turned toward the upper position. The movement of the eccentric cylinder 110 toward the upper position is transmitted via the reflector links 114, 124 to the radiant heaters 48, 50 to move the radiant heaters 48, 50 toward the second position 134 so that the distribution of radiant heat along the longitudinal extent of the stationary beams 162 is broadened to decrease the temperature of the stationary beams 162.

It will be clear that the present invention provides an efficient heat shrink tunnel apparatus incorporating a minimal expenditure of energy for heating articles while providing a simple but effective temperature control capability. It is also clear that changes may be made in the construction and the arrangement of the parts of the elements of the walking beam shrink tunnel apparatus as disclosed herein without departing from the spirit and scope of the invention as defined in the following claims.

What is claimed is:

1. An apparatus for conveying an article, comprising:
    a base, comprising:
        a first interior beam extending along a forward direction, the first interior beam having a slot formed longitudinally in a forward end thereof and having a slot formed longitudinally in a rear end thereof;
        a second interior beam extending along the forward direction, the second interior beam having a slot formed longitudinally in a forward end thereof corresponding to the forward end of the first interior beam and having a slot formed longitudinally in a rear end thereof corresponding to the rear end of the first interior beam; and
    a plurality of spaced apart stationary beams mounted on the base and extending along the forward direction, the upper surfaces of the stationary beams forming a stationary horizontal support surface;
    a plurality of spaced apart walking beams movably supported on the base in an interspersed relation with the stationary beams and extending along the forward direction, the upper surfaces of the walking beams forming a moving horizontal support surface; and
    sliding block means for repetitively moving the walking beams in a substantially elliptical pattern wherein the moving horizontal support surface is alternately moved in the forward direction while positioned above the stationary support surface and moved in a rearward direction while positioned below the stationary support surface, the sliding block means comprising:
        a first forward sliding block slidably mounted in the slot formed in the forward end of the first interior beam, the first forward sliding block having a support rod slot formed therein and the support rod slot being characterized as sloping downwardly in the forward direction;
        a first rear sliding block slidably mounted in the slot formed in the rear end of the first interior beam, the first rear sliding block having a support rod slot formed therein and the support rod slot being characterized as sloping downwardly in the forward direction;
        a second forward sliding block slidably mounted in the slot formed in the forward end of the second interior beam, the second forward sliding block having a support rod slot formed therein and the support rod slot being characterized as sloping downwardly in the forward direction;
        a second rear sliding block slidably mounted in the slot formed in the rear end of the second interior beam, the second rear sliding block having a support rod slot formed therein and the support rod slot being characterized as sloping downwardly in the forward direction;

a forward walking beam support rod slidably mounted in the support rod slot of the first forward sliding block and slidably mounted in the support rod slot of the second forward sliding block;

a rear walking beam support rod slidably mounted in the support rod slot of the first rear sliding block and slidably mounted in the support rod slot of the second rear sliding block, the forward walking beam support rod and the rear walking beam support rod supportably engaging the walking beams such that the walking beams are supported on the base via the forward walking beam support rod and the rear walking beam support rod; and drive means connected to the sliding blocks and to the walking beam support rods for longitudinally reciprocating the sliding blocks with respect to the interior beams and for simultaneously reciprocating the walking beam support rods along the support rod slots of the sliding blocks out of phase with the longitudinal reciprocation of the sliding blocks.

2. The apparatus of claim 1 wherein the sliding block means further comprises:

a forward block connecting rod connecting the first forward sliding block to the second forward sliding block;

a rear block connecting rod connecting the first rear sliding block to the second rear sliding block;

a first sliding block connecting arm connecting the first forward sliding block to the first rear sliding block; and a second sliding block connecting arm connecting the second forward sliding block to the second rear sliding block, whereby each sliding block is fixed in relation to each other sliding block for movement of the sliding blocks in unison; and wherein the drive means comprises:

a drive shaft supported for rotation by the first interior beam and by the second interior beam;

a motor connected to the drive shaft for rotating the drive shaft;

a first crank mounted on one end of the drive shaft for rotation about the axis of the drive shaft;

a cylindrical first sliding block cam mounted on the first crank, the axis of the first sliding block cam being displaced from the axis of the drive shaft whereby rotation of the crank by the drive shaft moves the first sliding block cam along a circular path; and a first sliding block drive rod rotatably connected to the first sliding block cam and to the rear block connecting rod.

3. The apparatus of claim 2 wherein the sliding block means further comprises:

a first support rod connecting arm connecting the forward walking beam support rod to the rear walking beam support rod; and a second support rod connecting arm connecting the forward walking beam support rod to the rear walking beam support rod, the second support rod connecting arm being substantially parallel to the first support rod connecting arm and spaced a distance therefrom whereby the walking beam connecting arms fix the relative positions of the walking beam support rods such that the walking beam support rods move in unison; and wherein the drive means further comprises:

a cylindrical first support rod cam mounted on the first sliding block cam, the axis of the first support rod cam being substantially parallel to the axis of the first sliding block cam and displaced a preselected distance therefrom toward a trailing edge of the first sliding block cam; and a first support rod drive rod rotatably connected to the first support rod cam and to the rear walking beam support rod.

4. The apparatus of claim 3 wherein the drive means further comprises:

a second crank mounted on a second end of the drive shaft;

a cylindrical second sliding block cam mounted on the second crank, the axis of the second sliding block cam positioned coaxially with the axis of the first sliding block cam;

a second sliding block drive rod rotatably connected to the second sliding block cam and to the rear block connecting rod;

a cylindrical second support rod cam mounted on the second sliding block cam, the axis of the second support rod cam positioned coaxially with the axis of the first support rod cam; and a second support rod drive rod rotatably connected to the second support rod cam and to the rear walking beam support rod.

5. The apparatus of claim 1 further comprising:

a clamp assembly mounted on the forward walking beam support rod, the clamp assembly on the forward walking beam support rod engaging a portion of each walking beam to secure the walking beams to the forward walking beam support rod; and a clamp assembly mounted on the rear walking beam support rod, the clamp assembly on the rear walking beam support rod engaging a portion of each walking beam to secure the walking beams to the rear walking beam support rod.

6. The apparatus of claim 5 wherein each clamp assembly comprises:

a plurality of fixed clamp members, each clamp member characterized as being a dished plate having a convex surface engaging a walking beam; and at least one clamping subassembly comprising:

two clamp members characterized as being dished plates having convex surfaces engaging a walking beam, each clamping subassembly disposed between two fixed clamp members; and a spring disposed between the clamp members forcing the convex faces thereof into engagement with the walking beams.

7. The apparatus of claim 6 wherein the number of fixed clamp members comprising each clamp assembly is four and wherein each clamping assembly comprises two clamping subassemblies, one clamping subassembly disposed between two fixed clamp members and the other clamping subassembly disposed between the other two fixed clamp members.

8. A walking beam shrink tunnel apparatus, comprising: a heating chamber, said heating chamber incorporating a casing having a tunnel formed therethrough, heating means operatively associated with the heating chamber and provided for heating an object transported through the tunnel, conveyor means provided for transporting the object through the tunnel, said conveyor means incorporating a base extending through the tunnel, a plurality of spaced apart walking beams movably supported on the base in an interspersed relation with the stationary beams and extending through the tunnel, the upper surfaces of the walking beams forming a movable horizontal support surface, sliding block means operatively associated with the approximate ends of each walking beam, a drive assembly provided for furnishing movement to the sliding block means, motor means operatively associated with the drive assembly to provide for its actuation, a pair of drive rods interconnecting between the said drive assembly and the sliding block means for furnishing both longitudinally reciprocal and vertical displacement to said sliding block means and their supported walking beams for effecting timed vertical displacement of said walking beams with respect to the stationary beams for furnishing transfer of a film wrapped article through the shrink tunnel apparatus.

9. A walking beam shrink tunnel apparatus, comprising, a heating chamber comprising, a casing having a tunnel formed therethrough, a heating means for heating an object transported through the tunnel, and conveyor means for transporting the object through the tunnel comprising a base extending through the tunnel, a plurality of spaced apart stationary beams mounted along the base and extending through the tunnel, the upper surfaces of the stationary beams forming a stationary horizontal support surface, a plurality of spaced apart walking beams movably supported on the base in an interspersed relation with the stationary beams and extending through the tunnel, the upper surfaces of the walking beams forming a moving horizontal support surface, sliding block means for repetitively moving the walking beams in a substantially elliptical pattern wherein the moving horizontal support surface is alternately moved in a forward direction while positioned above the stationary support surface and moved in a rearward direction while positioned below the stationary support surface, said heating means comprising at least one radiant heater, said radiant heater characterized by comprising a heating element disposed within the casing of the heating chamber, and a reflector positioned with respect to the heating element to direct radiant heat therefrom towards the stationary beams and the walking beams, each heating element of each radiant heater being characterized as being a rod having an axis disposed substantially parallel to the horizontal stationary support surface, wherein the reflector of each radiant heater is characterized as being a semicylinder, and wherein the reflector of each radiant heater is rotatably supported for rotation about the axis of the heating element, the reflector of each radiant heater being further characterized as being an elliptical semicylinder having a first focal line disposed substantially along the axis of the heating element of the radiant heater and a second focal line positioned on the stationary horizontal support surface of a first position of the radiant heater, said heating means further comprising temperature control means for rotating the reflector of each radiant heater towards the first position thereof to focus radiant heat on the stationary horizontal support surface and for rotating the reflector of each radiant heater to a second position wherein the second focal line is positioned above the stationary horizontal support surface, said temperature control means comprising a shaft rotatable mounted on the casing of the heating chamber, an eccentric cylinder connected to the shaft and movable thereby from a lower position wherein the axis of the eccentric cylinder is disposed below the axis of the shaft and to an upper position wherein the axis of the eccentric cylinder is disposed above the axis of the shaft, reflector link means connecting the eccentric cylinder to the radiant heaters for positioning the radiant heaters in the first position when the eccentric cylinder is in the lower position thereof, and for positioning the radiant heaters in the second position when the eccentric cylinder is in the upper position thereof, said shrink tunnel having first and second radiant heaters, said shrink tunnel being further characterized by having biased means for maintaining a preset configuration of the temperature control means, the biasing means comprising a spring plate positioned above the eccentric cylinder and pivotally connected to the first radiant heater and the second radiant heater, the spring plate movable in a downward direction to pivot the radiant heaters toward the first position thereof, a spring connecting to the spring plate, and a spring extension connecting the spring to the eccentric cylinder, whereby tension in the spring urges the eccentric cylinder towards the upper position thereof to urge the radiant heaters toward the second position thereof and whereby tension in the spring urges the spring plate downwardly to urge the radiant heaters to the first position thereof.

10. A walking beam shrink tunnel apparatus, comprising, a heating chamber comprising a casing having a tunnel formed therethrough, heating means for heating an object transported through the tunnel, and conveyor means for transporting the object through the tunnel, comprising, a base extending through the tunnel, a plurality of spaced apart stationary beams mounted on the base and extending through the tunnel, the upper surfaces of the stationary beams forming a stationary horizontal support surface, a plurality of spaced apart walking beams movably supported on the base in an interspersed relation with the stationary beams and extending through the tunnel, the upper surfaces of the walking beams forming a moving horizontal support surface, sliding block means for repetitively moving the walking beams in a substantially elliptical pattern wherein the moving horizontal support surfaces alternately move in a forward direction while positioned above the stationary support surface and move in a rearward direction while positioned below the stationary support surface, said base comprising a first interior beam having a slot formed longitudinally in a forward end thereof and having a slot formed longitudinally in a rear end thereof, a second interior beam having a slot formed longitudinally in a forward end thereof corresponding to the forward end of the first interior beam and having a slot formed longitudinally in a rear end thereof corresponding to the rear end of the first interior beam, and wherein a sliding block means comprises a first forward sliding block slidably mounted in the slot formed in the forward end of the first interior beam, the first forward sliding block having a support rod slot formed therein and the support rod slot being characterized as sloping downwardly in a forward direction, a first rear sliding block slidably mounted in the slot formed in the rear end of the first interior beam, the first rear sliding block having a support rod slot formed therein and the support rod slot being characterized as sloping downwardly in a forward direction, a second forward sliding block slidably mounted in the slot formed in the forward end of the second interior beam, the second forward sliding block having a support rod slot formed therein and the support rod slot being characterized as sloping downwardly in a forward direction, a second rear sliding block slidably mounted in the slot formed in the rear end of the second interior beam, the second rear sliding block having a support rod slot formed therein and the support rod slot being characterized as sloping downwardly in a forward direction, a forward walking beam support rod slidably mounted in the support rod slot of the first forward sliding block and slidably mounted in the support rod slot of the second forward sliding block, a rear walking beam support rod slidably mounted in the support rod slot of the first rear sliding block and slidably mounted in the support rod slot of the second rear sliding block, and drive means connected to the sliding block and to the walking beam support rods for longitudinally reciprocating the sliding blocks with respect to the interior beams and for simultaneously reciprocating the walking beam support rods along the support rod slots of the sliding blocks out of phase with the longitudinal reciprocation of the sliding blocks, and wherein the walking beams are supported on the base via the walking support rods.

11. The invention of claim 8 and wherein said heating means incorporating at least one radiant heater disposed within the casing for applying radiant heat to the support surface, the radiant heater characterized as comprising a heating element as positioned above the support surface, a reflector positioned with respect to the heating element to direct radiant heat therefrom towards the support surface, the support surface being characterized as having a heat absorbing surface, the heating element of each radiant heater incorporating a rod having an axis disposed substantially parallel to the support surface, and wherein the reflector of each radiant heater is characterized as being a semi-cylinder, and wherein the reflector of each radiant heater is pivotally supported for rotating about the axis of the heating element.

12. The walking beam shrink tunnel of claim 8 wherein the stationary beams and the walking beams are characterized as having a heat absorbing surface.

13. The walking beam shrink tunnel of claim 8, wherein the heating means comprises at least one radiant heater, the radiant heater characterized as comprising, a heating element disposed within the casing of the heating chamber, a reflector positioned with respect to the heating element to direct radiant heat toward the stationary beams and the walking beams, each heating element including a rod having an axis disposed substantially parallel to the horizontal stationary surface, wherein the reflector of each radiant heater is characterized as being a semicylinder, and the reflector of each radiant heater is pivotally supported for pivoting about the axis of the heating element.

14. The walking beam shrink tunnel of claim 13 wherein the heating means further comprises temperature control means for pivoting the reflector of each radiant heater toward the first position thereof to focus radiant heat on the stationary horizontal support surface and for pivoting the reflector of each radiant heater to a second position wherein the second focal line is positioned above the stationary horizontal support surface.

15. The walking beam shrink tunnel of claim 14 wherein the temperature control means comprises:
 a shaft pivotally mounted on the casing of the heating chamber;
 an eccentric cylinder connected to the shaft and movable thereby from a lower position wherein the axis of the eccentric cylinder is disposed below the axis of the shaft and to an upper position wherein the axis of the eccentric cylinder is disposed above the axis of the shaft; and
 reflector link means connecting the eccentric cylinder to the radiant heaters for positioning the radiant heaters in the first position when the eccentric cylinder is in the lower position thereof and for positioning the radiant heaters in the second position when the eccentric cylinder is in the upper position thereof.

16. The walking beam shrink tunnel of claim 15 characterized as having a first radiant heater and a second radiant heater.

17. The walking beam shrink tunnel of claim 10 wherein the sliding block means further comprises:
 a forward block connecting rod conecting the first forward sliding block to the second forward sliding block;
 a rear block connecting rod connecting the first rear sliding block to the second rear sliding block;
 a first sliding block connecting arm connecting the first forward sliding block to the first rear sliding block; and
 a second sliding block connecting arm connecting the second forward sliding block to the second rear sliding block, whereby each sliding block is fixed in relation to each other sliding block for movement of the sliding blocks in unison; and
wherein the drive means comprises:
 a drive shaft supported for rotation by the first interior beam and by the second interior beam;
 a motor connected to the drive shaft for rotating the drive shaft;
 a first crank mounted on one end of the drive shaft for rotation about the axis of the drive shaft;
 a cylindrical first sliding block cam mounted on the first crank, the axis of the first sliding block cam being displaced from the axis of the drive shaft whereby rotation of the crank by the drive shaft moves the first sliding block cam along a circular path; and
 a first sliding block drive rod rotatably connected to the first sliding block cam and to the rear block connecting rod.

18. The walking beam shrink tunnel of claim 17 wherein the sliding block means further comprises:
 a first support rod connecting arm connecting the forward walking beam support rod to the rear walking beam support rod; and
 a second support rod connecting arm connecting the forward walking beam support rod to the rear walking beam support rod, the second support rod connecting arm being substantially parallel to the first support rod connecting arm and spaced a distance therefrom whereby the walking beam connecting arms fix the relative positions of the walking beam support rods such that the walking beam support rods move in unison; and
wherein the drive means further comprises:
 a cylindrical first support rod cam mounted on the first sliding block cam, the axis of the first support rod cam being substantially parallel to the axis of the first sliding block cam and displaced a preselected distance therefrom toward a trailing edge of the first sliding block cam; and a first support rod drive rod rotatably connected to the first support rod cam and to the rear walking beam support rod.

19. The walking beam shrink tunnel of claim 18 wherein the drive means further comprises:
  a second crank mounted on a second end of the drive shaft;
  a cylindrical second sliding block cam mounted on the second crank, the axis of the second sliding block cam positioned coaxially with the axis of the first sliding block cam;
  a second sliding block drive rod rotatably connected to the second sliding block cam and to the rear block connecting rod;
  a cylindrical second support rod cam mounted on the second sliding block cam, the axis of the second support rod cam positioned coaxially with the axis of the first support rod cam; and
  a second support rod drive rod rotatably connected to the second support rod cam and to the rear walking beam support rod.

20. The walking beam shrink tunnel of claim 10 further comprising:
  a clamp assembly mounted on the forward walking beam support rod, the clamp assembly on the forward walking beam support rod engaging a portion of each walking beam to secure the walking beams to the forward walking beam support rod; and
  a clamp assembly mounted on the rear walking beam support rod, the clamp assembly on the rear walking beam support rod engaging a portion of each walking beam to secure the walking beams to the rear walking beam support rod.

21. The walking beam shrink tunnel of claim 20 wherein each clamp assembly comprises:
  a plurality of fixed clamp members, each clamp member characterized as being a dished plate having a convex surface engaging a walking beam; and
  at least one clamping subassembly comprising:
  two clamp members characterized as being dished plates having convex surfaces engaging a walking beam, each clamping subassembly disposed between two fixed clamp members; and
  a spring disposed between the clamp members forcing the convex faces thereof into engagement with the walking beams.

22. The walking beam shrink tunnel of claim 21 wherein the number of fixed clamp members comprising each clamp assembly is four and wherein each clamping assembly comprises two clamping subassemblies, one clamping subassembly disposed between two fixed clamp members and the other clamping subassembly disposed between the other two fixed clamp members.

23. The heating chamber of claim 11 further comprising temperature control means for pivoting the reflector of each radiant heater to a first position thereof to focus radiant heat on the support surface and for pivoting the reflector of each radiant heater to a second position wherein a second focal line is positioned above the support surface.

24. The heating chamber of claim 23 wherein the temperature control means comprises:
  a shaft rotatably mounted on the casing;
  an eccentric cylinder connected to the shaft and movable thereby from a lower position wherein the axis of the eccentric cylinder is disposed below the axis of the shaft and to an upper position wherein the axis of the eccentric cylinder is disposed above the axis of the shaft; and
  reflector link means connecting the eccentric cylinder to the radiant heaters for positioning the radiant heaters in the first position when the eccentric cylinder is in the lower position thereof and for positioning the radiant heaters in the second position when the eccentric cylinder is in the upper position thereof.

25. The heating chamber of claim 24 characterized as having a first radiant heater and a second radiant heater.

26. The heating chamber of claim 25 further comprising biasing means for maintaining a preset configuration of the temperature control means, the biasing means comprising:
  a spring plate positioned above the eccentric cylinder and pivotally connected to the first radiant heater and the second radiant heater, the spring plate movable in a downward direction to pivot the radiant heaters toward the first positions thereof;
  a spring connected to the spring plate; and
  a spring extension connecting the spring to the eccentric cylinder, whereby tension in the spring urges the eccentric cylinder toward the upper position thereof to urge the radiant heaters toward the second position thereof and whereby tension in the spring urges the spring plate downwardly to urge the radiant heaters to the first position thereof.

* * * * *